(12) United States Patent
Williams

(10) Patent No.: US 6,641,310 B2
(45) Date of Patent: Nov. 4, 2003

(54) FIBER OPTIC CABLE CONNECTOR

(75) Inventor: Richard J. Williams, Hollis, NH (US)

(73) Assignee: Teraconnect, Inc., Nashua, TN (US)

( * ) Notice: Subject to any disclaimer, the term of this patent is extended or adjusted under 35 U.S.C. 154(b) by 0 days.

(21) Appl. No.: 09/726,150

(22) Filed: Nov. 29, 2000

(65) Prior Publication Data

US 2002/0025125 A1 Feb. 28, 2002

Related U.S. Application Data

(60) Provisional application No. 60/199,027, filed on Apr. 21, 2000, provisional application No. 60/199,033, filed on Apr. 21, 2000, provisional application No. 60/199,095, filed on Apr. 21, 2000, and provisional application No. 60/199,099, filed on Apr. 21, 2000.

(51) Int. Cl.[7] .................................................. G02B 6/36
(52) U.S. Cl. ............................ 385/92; 385/54; 385/58; 385/59; 385/70; 385/72; 385/75; 385/73
(58) Field of Search .............................. 385/92, 54, 58, 385/59, 70, 72, 73, 75, 139

(56) References Cited

U.S. PATENT DOCUMENTS

| | | | | |
|---|---|---|---|---|
| 4,687,291 A | * | 8/1987 | Stape et al. | 385/59 |
| 4,690,495 A | * | 9/1987 | Giannini | 385/57 |
| 4,753,510 A | * | 6/1988 | Sezerman | 385/61 |
| 5,671,311 A | * | 9/1997 | Stillie et al. | 385/60 |
| 5,684,308 A | * | 11/1997 | Lovejoy et al. | 257/184 |
| 5,858,814 A | | 1/1999 | Goossen et al. | |
| 5,978,401 A | | 11/1999 | Morgan | |

OTHER PUBLICATIONS

M. Ajmone Marsan et al, Modelling Slotted Multi–Channel Ring All–Optical Networks, *IEEE,* 1997, p. 146–153.
Marco Ajmone Marsan et al, Access Protocols for Photonic WDM Multi–Rings with Tunable Transmitters and Fixed Receivers, *SPIE,* pp. 59–72, vol. 26921.
Carl Beckmann, Applications: Asynchronous Transfer Mode and Synchronous Optical Network, *Handbook of Fiber Optic Data Communication,* 1998, pp. 385–414, Academic Press.
Floyd E. Ross, An Overview of FDDI: The Fiber Distributed Data Interface, *IEEE Journal on Selected Areas in Communications,* Sep. 1989, pp. 1043–1051, vol. 7 No. 7.

* cited by examiner

Primary Examiner—David V. Bruce
Assistant Examiner—George Y. Wang
(74) Attorney, Agent, or Firm—Maine & Asmus

(57) ABSTRACT

A fiber optic cable connector including a coupler body with a channel for receiving a connector plug therein; and a door spanning the channel, the door biased to cover the channel but displaceable with respect to the channel when the plug body is received in the channel to prevent light from escaping the channel when the plug body is removed from the channel.

14 Claims, 16 Drawing Sheets

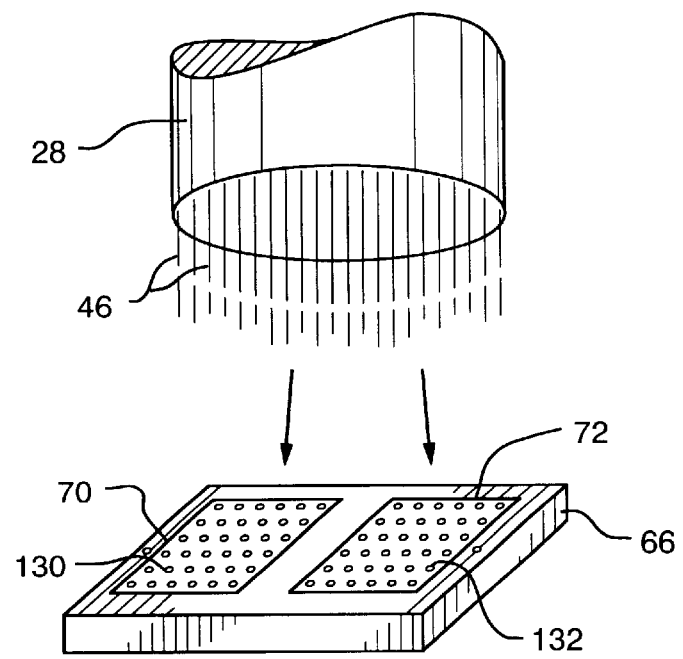
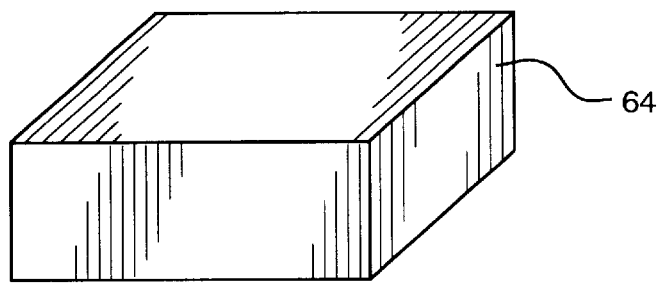
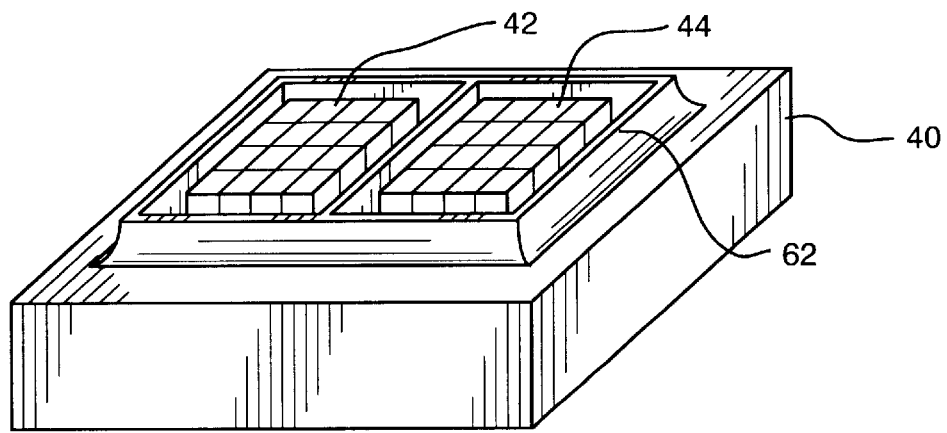
FIG. 3

FIBER OPTIC CABLE CONNECTOR

RELATED APPLICATIONS

This application is based on Provisional Patent Application Serial Nos. 60/199,033 filed Apr. 21, 2000; 60/199,099 filed Apr. 21, 2000; 60/199,027 filed Apr. 21, 2000 and 60/199,095 filed Apr. 21, 2000.

FIELD OF THE INVENTION

This invention relates to optical communication systems and more particularly to a fiber optic cable and transceiver connector system, a support system for the optical components of the transceiver, and fiber optic cable connectors.

BACKGROUND OF INVENTION

Optical couplers are now used to communicate optical signals over short and long distances between, for example, two computers, two circuit boards in one computer, and even two different chips on the same circuit board.

The technology associated with electronics has evolved extremely rapidly over the last 40 years. Computers and related peripheral equipment, satellite, and communication systems are becoming ever more sophisticated and powerful. A key factor leading to every increasing demand for faster data transfer rates is the need to perform tasks that are highly complex. Such tasks include digital signal processing, image analysis, and communications.

Data transfer, however, remains a gating capability. This issue holds true for data transfer within an integrated circuit, from one chip to another, from hybrid circuit to hybrid circuit, from one integrated circuit board to another integrated circuit board, and from system to system.

Increasing the data transfer rate can be done in any of several ways. Originally, the scheme used was to increase the number of data transfer lines, i.e., transfer the data in parallel. The historical progression according to this scheme has been in powers of two: The first real integrated circuits had 4 bit buses; next came 8 bit buses, which were then superceded by 16 bit buses; currently, 32 bit buses are the standard; and 64 bit buses are in development.

Such increases have typically come in two phases. In the first phase, a factor of two increases in the number of bits being processed takes place within the chip. Then, as the technology matures, the number of bits on the bus off the chip increases. Under such an approach, there is always a greater processing capability available on a chip than off it, and so, unfortunately, advances in chip design must wait for the rest of the system to catch up.

Accelerated development of wider bit buses (e.g. 128, 256, etc.) has been impeded by several factors including the practical limitation on the size of the mechanical connectors, the noise inherent in the signals arriving nearly simultaneously, the reliability of wide pin connectors, and the power required to drive multiple lines off-chip. As a result, many of today's successful networks are serial or relatively narrow (e.g., Gigabyte Ethernet or Myrinet) and transmitted over a single co-axial cable or possibly a single pair of optical fibers.

Another approach is to simply increase the speed with which the information is processed. Early microprocessors functioned at 4 MHz, and, with each succeeding year, the raw speed of microprocessors increases. Currently, processor speeds in excess of 400 MHz are common and processors with speeds in excess of 1 GHz are in the offing.

Increasing the processor speed is not without challenges, however, because increasing the speed also increases power requirements, introduces skew problems across the channel, and usually requires more exotic processing than is standard practice. Combining the two approaches, i.e., making wide and fast networks, is difficult because the combination of the problems inherent in each approach is overwhelming for existing technologies.

In response, integrated circuit technology that enables bi-directional, high-speed optical rather than electrical interconnections has been developed. This technology allows laser emitters and detectors to be integrated onto a semiconductor substrate, making electrical connection with electronic circuitry previously built on that substrate.

Thus, optical rather than electrical communications between electronic devices is accomplished. An optical transmitter-receiver module typically includes both light emitting devices such as vertical cavity surface emitting lasers (VCSELs) and light detecting devices such as photodiodes. Such a module may include separate chips, or more typically, the VCSELs and the photodiodes are grown on the same substrate. See U.S. Pat. No. 5,978,401 incorporated herein by this reference.

Driver-receiver circuitry modules, typically in the form of ASIC chips, include driver circuitry which receives electrical signals from one electronic device and which, in response, drives the VCSELs accordingly. The ASIC also include receiver circuitry for receiving signals from the photodiodes and, in response, which processes those electrical signals providing an appropriate output to the associated electronic device.

The combination of the VCSELs and the photodiodes and the ASIC circuitry is typically called an optical transceiver. One way to hybridize the VCSELs and the photodiodes and the ASIC receiver circuitry is by flip-chip bonding. See U.S. Pat. No. 5,858,814, incorporated herein by this reference.

A fiber optic cable then has one end connected to one transceiver and the other end connected to another transceiver via optical connectors.

As the density of the arrays of emitters and detectors increases, coupling a fiber optic cable to these arrays becomes an increasingly arduous task. Design considerations include properly aligning the active area of each emitter and detector with a particular fiber of the fiber optic bundle, fashioning reliable removable connectors which maintain alignment over repeated coupling and decoupling of the optical fiber bundle to the arrays, accommodating for the circuitry and wiring electrically connecting the arrays to other circuitry, keeping the arrays clean, manufacturing studies to insure that the cost of such couplers is not prohibitive and that they are not unduly complex, and insuring that when the coupler is removed from its transceiver, laser light emitted by the arrays of the transceiver does not harm the eyes of personnel in close proximity to the transceiver.

SUMMARY OF THE INVENTION

It is therefore an object of this invention to provide an improved fiber optic cable and transceiver connection system.

It is a further object of this invention to provide such a system which simplifies the coupling of a fiber optic cable to high density arrays of emitters and detectors.

It is a further object of this invention to provide such a system which makes it easier to properly align the active area of each emitter and detector with a particular optical fiber of the fiber optic bundle.

It is a further object of this invention to provide such a system which is highly reliable and which maintains alignment over repeated coupling and decoupling of the optical fiber bundle to the transceiver.

It is a further object of this invention to provide such a system which includes a standoff between the cable and the transceivers to accommodate the circuitry and wiring associated with the active arrays.

It is a further object of this invention to provide such a system which prevents contamination of the transceivers.

It is a further object of this invention to provide such a system which is not cost prohibitive and which is not unduly complex.

It is a further object of this invention to provide such a system which insures that when the fiber optic coupler is removed from the transceiver laser light emitted by the arrays of the transceiver cannot does not harm the eyes of the personnel in the area.

The invention results from the realization that if a support structure is fabricated about the emitter and/or detector arrays at the time the arrays are flip-chipped bonded to their associated circuitry modules, any associated optical components can be supported on the support structure on or over the arrays thus protecting the arrays and making it easier to provide a fiber optic bundle coupler which reliably aligns the fibers of the bundle with the individual emitters and/or detectors of the arrays.

This invention results from the further realization that if a face plate is used as an optical component to over-sample light from the arrays, then the face plate will also provide the required spacing between the fiber bundle and the arrays necessary to accommodate the circuitry surrounding the arrays and also that fiber alignment can now be more easily effected if a fiber bundle alignment plate is used in conjunction with the face plate and individual fibers of the bundle are threaded through the orifices of the alignment plate.

This invention results from the further realization that the difficulty and cost of manufacturing molded coupler components to the exact tolerances required to effect the necessary alignment required in a system with arrays of many emitters and detectors can be overcome by forming insert plates by precise etching processes and placing the insert plates in the individual molded coupler components to thus more reliably insure that the optical fibers are aligned with the arrays.

This invention results from the further realization that if the female half of the optical coupler is fashioned with a spring biased trap door, then, when the male half of the coupler is removed form the female half, any laser light emitted by the arrays will be shielded by the trap door thus preventing harm to the eyes of personnel in the vicinity of the transceiver.

This invention features a fiber optic cable and transceiver connection system comprising at least one array of emitters or detectors on a circuitry module; a support structure about the array; a collimator on the support structure; a fiber bundle alignment plate positioned over the collimator including at least one array of orifices therethrough; an alignment coupler including an opening therein for receiving the collimator; and means for fixing the fiber bundle alignment plate in a precise orientation with respect to the alignment coupler to establish a precise registration between the individual emitter or detectors of the array and optical fibers located in the orifices of the alignment plate.

The means for fixing may include a pair of pins extending from the alignment plate and corresponding orifices in the alignment coupler which receive the pins. The circuitry module is typically an ASIC which includes an array of emitters in the form VCSELs and an array of detectors in the form of photodetectors.

The circuitry module may be mounted on a substrate such as a heat sink. A set of standoffs are positioned upstanding from the substrate and the alignment coupler is mounted on the standoffs. Fasteners secure the alignment coupler with respect to the substrate.

The system may further include a fiber ferrule housing the alignment plate, a pin holder coupled to the fiber ferrule, a connector plug body housing the fiber ferrule, and means for releasably attaching the connector plug body to the alignment coupler. In the preferred embodiment, the collimator is a faceplate.

A fiber optic connector in accordance with this invention includes an alignment coupler including a housing thereon; a fiber bundle alignment plate mounted to a ferrule receivable within the housing of the alignment coupler; means for aligning the alignment plate with respect to the alignment coupler; and means for releasably locking the ferrule in the housing of the alignment coupler.

The means for aligning may include a pair of pins extending from the alignment plate and a pair of corresponding orifices in the alignment coupler. The means for releasably locking the ferrule in the housing of the alignment coupler typically includes: a plug body housing the ferrule, the plug body including a pair of outwardly extending ridges; and a coupler body with a channel for receiving the coupler housing and the plug body, the channel of the coupler body including a pair of latching members biased over the outwardly extending ridges of the plug body, the plug body further including a sliding mechanism for urging the latching members away from the outwardly extending ridges to remove the plug body from the coupler body.

A fiber optic connector in accordance with one embodiment of the subject invention includes a female portion and a male portion. The female portion includes an alignment coupler including a housing thereon, and a coupler body with a channel which receives the coupler housing. The male portion includes a fiber ferrule including an alignment plate, and a plug body housing the fiber ferrule. Such a connector further includes means for accurately positioning the alignment plate in the housing of the alignment coupler, and means for releasably coupling the male portion to the female portion.

The means for accurately positioning the alignment plate in the housing of the alignment coupler typically includes at least one pin extending from the alignment plate and at least one orifice in the alignment coupler for receiving said pin. The means for releasably coupling the male portion to the ferrule portion may include a coupler body place over the alignment coupler, the coupler body including at least one latch member, and at least one ridge on the plug body. The latch member is positioned over the ridge on the plug body when the male portion of the connector is coupled to the ferrule portion of the connector.

This invention also features a support system for a fiber optic transceiver, the support system comprising: a circuitry module; at least one array of active elements on the circuitry module, the individual active elements separated by a gap; and a structure supporting optical components on or above the individual active elements. The supporting structure may surround the array of active elements. Alternatively, the support structure includes a first set of spaced members in the gaps between individual active elements running in a first direction and a second set of spaced members in the gaps between individual active elements running in a second direction orthogonal to the first direction. In still another embodiment, the support structure includes discrete posts in the gaps.

The method of forming a support structure for a fiber optic transceiver in accordance with this invention includes forming an array of individual active elements in a wafer by etching channels between the individual active elements, said channels formed in the wafer deeper than required to achieve electrical isolation between individual active elements; inserting a flowable substance into the channels and allowing the substance to harden; flip chip bonding the wafer to a circuitry module; and removing all wafer structure other than the individual active elements and the hardened substance.

This invention also features a fiber optic connector comprising: a molded alignment coupler including a base plate, an opening in the base plate, and at least one alignment channel in the base plate, a housing upstanding from base plate surrounding the opening and the at least one alignment channel; and an insert plate in the housing, the insert plate including an opening etched therethrough corresponding to the opening in the base plate of the coupler, and at least one channel etched in the insert plate corresponding to the alignment channel of the coupler.

The channel of the insert plate is preferably conical in shape and the insert plate may further includes at least one keyway and the base plate then includes at least one key for positioning the insert plate on the base plate.

The connector may further include a fiber bundle alignment plate mounted to a ferrule receivable within the housing of the alignment coupler; means for aligning the alignment plate with respect to the alignment coupler; and means for releasably locking the ferrule in the housing of the alignment coupler.

The means for aligning may include at least one pin extending from the alignment plate receivable in the alignment channel of the alignment coupler. The means for releasably locking the ferrule in the housing of the alignment coupler may include a plug body housing the ferrule, the plug body including a pair of outwardly extending ridges; and a coupler body with a channel for receiving the coupler housing and the plug body, the channel of the coupler body including a pair of latching members biased over the outwardly extending ridges of the plug body, the plug body further including a sliding mechanism for urging the latching members away from the outwardly extending ridges to remove the plug body from the coupler body.

The connector may have a female portion including a coupler body with a channel which receives the coupler housing; and a male portion including: a fiber ferrule including an alignment plate, and a plug body housing the fiber ferrule; the connector further including means for accurately positioning the alignment plate in the housing of the alignment coupler; and means for releasably coupling the male portion to the female portion.

The means for accurately positioning the alignment plate in the housing of the alignment coupler may include at least one pin extending from the alignment plate, the pin received in the alignment channel of the alignment coupler. The means for releasably coupling the male portion to the female portion typically includes a coupler body placed over the alignment coupler, the coupler body including at one latch member, and at least one ridge on the plug body. The latch member is positioned over the ridge on the plug body when the male portion of the connector is coupled to the ferrule portion of the connector.

This invention also features a fiber optic cable connector comprising: a coupler body with a channel for receiving a connector plug therein; and a door spanning the channel, the door biased to cover the channel but displaceable with respect to the channel when the plug body is received in the channel to prevent light from escaping the channel when the plug body is removed from the channel. The door is usually hinged on each end to the channel and includes at least one spring biasing the door in a position spanning the channel.

A fiber optic cable and transceiver connection system in accordance with this invention may include at least one array of emitters on a circuitry module; a support structure about the array; a collimator on the support structure; a fiber bundle alignment plate positioned over the collimator including at least one array of orifices therethrough; a coupler including an opening therein for receiving the collimator; and means for preventing light from the emitters from escaping the coupler.

The system may further include a pair of pins extending from the alignment plate and corresponding orifices in the coupler which receive the pins. The circuitry module may be an ASIC which includes an array of emitters in the form VCSELs and an array of detectors in the form of photodetectors. The circuitry module may be mounted on a substrate and the system then further includes a set of standoffs upstanding from the substrate and the coupler is mounted on the standoffs. Fasteners secure the coupler with respect to the substrate.

The system may further include a fiber ferrule housing the alignment plate, a pin holder coupled to the fiber ferrule, a connector plug body housing the fiber ferrule, and means for releasably attaching the connector plug body to the coupler.

The collimator is typically a face plate and the means for preventing may include a coupler body with a channel for receiving a plug therein; and a door spanning the channel, the door biased to cover the channel but displaceable with respect to the channel when the plug body is received in the channel to prevent light from escaping the channel when the plug body is removed from the channel. The door may be hinged on each end to the channel and typically includes at least one spring biasing the door in a position spanning the channel.

A fiber optic connector according to this invention has an alignment coupler including a housing thereon; a fiber bundle alignment plate mounted to a ferrule receivable within the housing of the alignment coupler; means for aligning the alignment plate with respect to the alignment coupler; means for releasably locking the ferrule in the housing of the alignment coupler; and means for sealing the alignment coupler.

The means for aligning typically includes a pair of pins extending from the alignment plate and a pair of corresponding orifices in the alignment coupler. The means for releasably locking the ferrule in the housing of the alignment coupler typically includes a plug body housing the ferrule, the plug body including a pair of outwardly extending ridges; and a coupler body with a channel for receiving the coupler housing and the plug body, the channel of the coupler body including a pair of latching members biased over the outwardly extending ridges of the plug body, the plug body further including a sliding mechanism for urging the latching members away from the outwardly extending ridges to remove the plug body from the coupler body.

In the preferred embodiment, the means for sealing include a coupler body with a channel for receiving a connector plug and the alignment coupler therein; and a door spanning the channel, the door biased to cover the channel but displaceable with respect to the channel when the plug body is received in the channel to prevent light from escaping the channel when the plug body is removed from the channel. Usually the door is hinged on each end to the channel and includes at least one spring biasing the door in a position spanning the channel.

BRIEF DESCRIPTION OF THE DRAWINGS

Other objects, features and advantages will occur to those skilled in the art from the following description of a preferred embodiment and the accompanying drawings, in which:

FIG. 3 is an exploded schematic view of the support structure, the faceplate, and the fiber bundle alignment plate components of the subject invention;

DISCLOSURE OF THE PREFERRED EMBODIMENT

Figure 1:
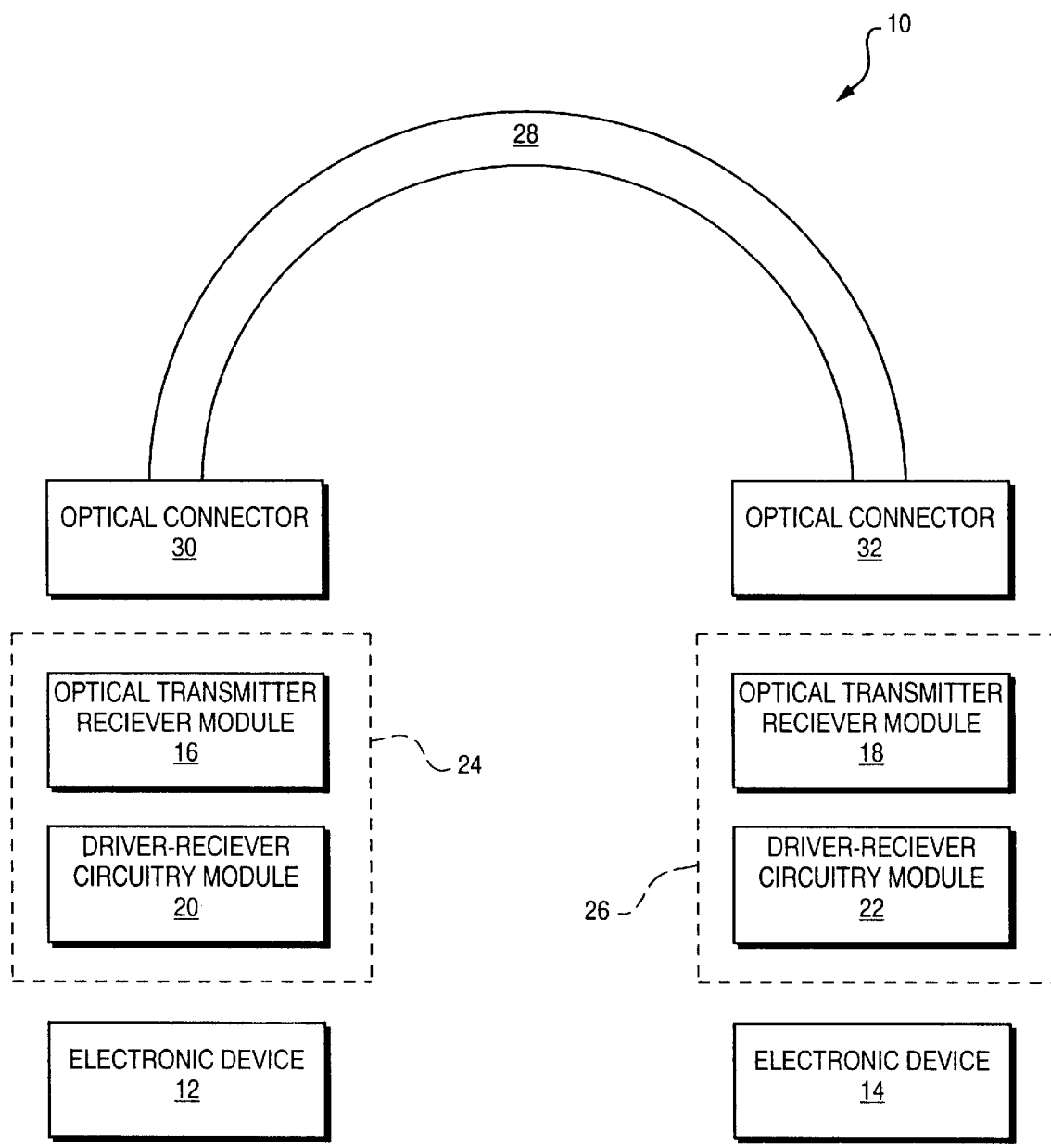
FIG. 1 is a schematic view of an optical communication system in accordance with the subject invention.

As stated in the background section above, optical communication system 10, FIG. 1 provides for optical rather than electrical communications between electronic device 12 and electronic device 14. Electronic devices 12 and 14 may be computers, see U.S. Pat. No. 5,912,913, FIG. 4, two circuit boards in one computer, or two different chips on one circuit board.

Optical transmitter-receiver modules 16 and 18 typically include both light emitting devices such as vertical cavity surface emitting lasers (VCSELs) and light detecting devices such as photodiodes. The VCSELs and photodiodes of modules 16 and 18 may be grown on the same substrate. See U.S. Pat. No. 5,978,401.

Driver-receiver circuitry modules 20 and 22 may be in the form of ASIC chips and include driver circuitry for receiving electrical signals from electronic devices 12 and 14 and, in response, driving the VCSELs accordingly. The ASICS also include receiver circuitry for receiving signals from the photodiodes and, in response, processing these electrical signals and providing an appropriate output to electronic devices 12 and 14.

The combination of the VCSELs and the photodiodes and the ASIC is called an optical transceiver as shown at 24 and 26. One way to hybridize the VCSELs and the photodiodes with the ASIC is by flip-chip bonding. See U.S. Pat. No. 5,858,814.

Fiber optic cable 28 has one end connected to transceiver 24 and its other end connected to transceiver 26 via optical connectors 30 and 32, respectively. See U.S. Pat. Nos. 5,912,913 and 5,631,988 incorporated herein by this reference.

In this way, electronic device 12 generates an electrical output signal received by module 20 which in turn drives the VCSELs generating light pulses representative of the electrical output signals. These light pulses are coupled to fiber optic bundle 28 by optical connector 32. The detectors of module 18 then receive these light pulses and in response output an electrical signal representative of the light pulses and this electrical signal is processed by the receiver circuitry of module 22 and communicated to electronic device 14 for further processing.

As shown, system 10 is capable of bi-directional optical communications but in some embodiments uni-directional communications is accomplished if transceiver 24 includes only VCSELs and transceiver 26 includes only detectors in which case module 20 includes only VCSEL driving circuitry and module 22 includes only receiver circuitry. Modules 20 and 22, however, may each include circuitry other than the driving and receiver circuitry.

Figure 2:
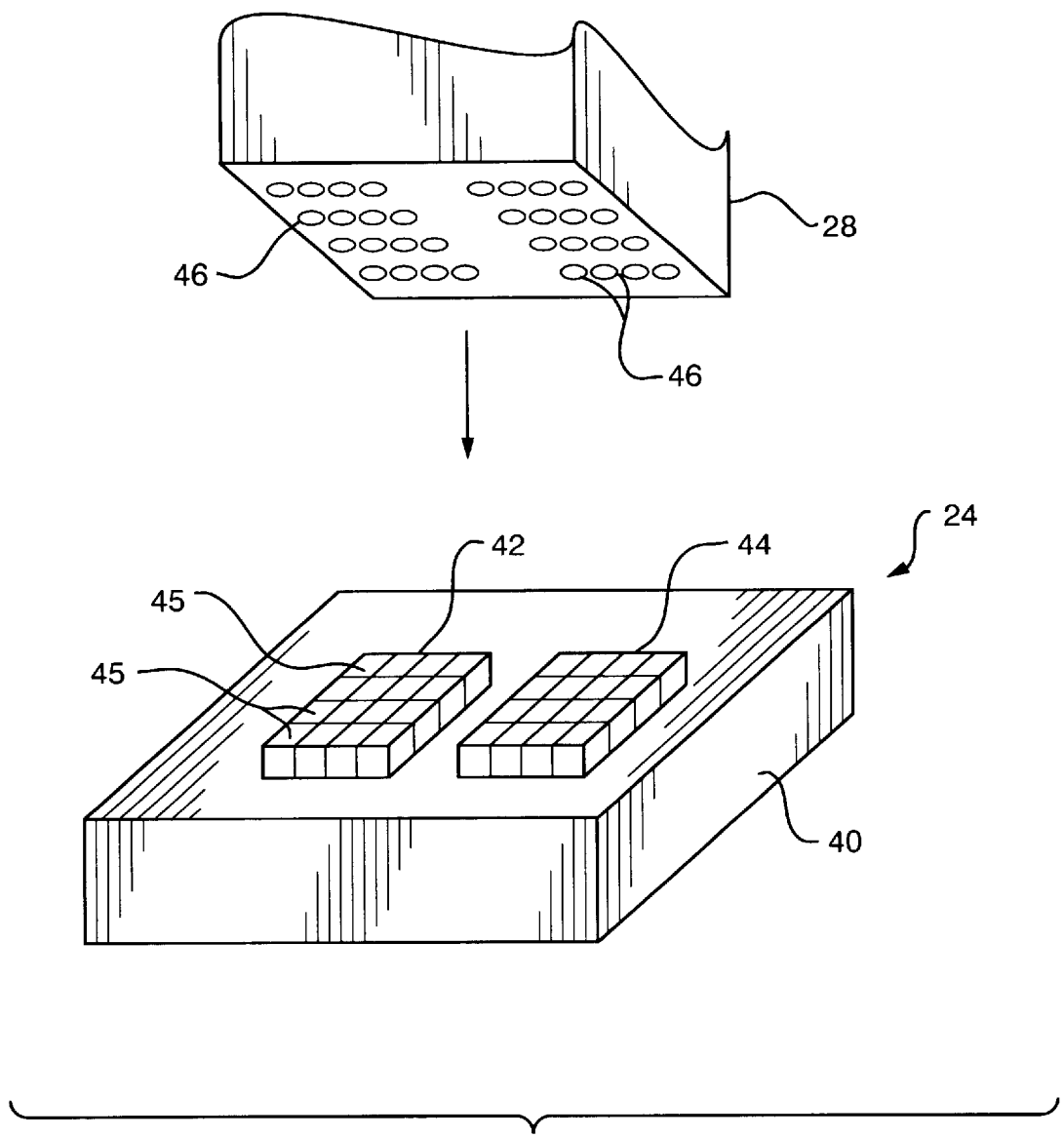
FIG. 2 is an exploded view schematically depicting one end of a fiber optic bundle which must be optically connected to an array of emitters and detectors on a driver-receiver circuitry module.

Optical transceiver 24, FIG. 2 includes ASIC 40 with active elements in the form of VCSEL array 42 and photodetector array 44 hybridized thereon.

VCSEL array 42 includes a 16×20 array of individual VCSELs seven microns high and the individual VCSELs 45 each have an active area of only about 120 microns squared.

Thus, it is very difficult to accurately position and reliably align each optical fiber 46 of bundle 28 over the active area of each VCSEL. The same is true of the detectors of 16×20 array 44. For larger arrays, this problem is only compounded.

Thus, separately and precisely adhering the distal end of 320 optical fibers to the active area of 320 VCSELs and adhering the distal end of 320 optical fibers to the active area of 320 photodetectors is, at best, cost and time prohibitive and made even more complex in the case where arrays 42 and 44 each include both VCSELs and detectors and/or more than 320 individual active elements.

In the subject invention, three primary components contribute to a much easier to assemble, precise alignment, and robust connection system: support structure 62, FIG. 3 about arrays 42 and 44, collimator device 64 which rests on support structures 62, and fiber bundle alignment plate 66 on or over on collimator device 64.

The individual fibers 46 of bundle 28 are placed in two 16×20 arrays of orifices 70, 72 in alignment plate 66. After polishing, the distal ends of these fibers are in optical communication with collimator device 64, which, in this embodiment, is a face plate but in other embodiments could be a series of light pipes, an order array of fibers, or an array of lenses. Faceplate 64 is manufactured by Schott Fiber Optics, Southbridge, Mass.

Figure 4:
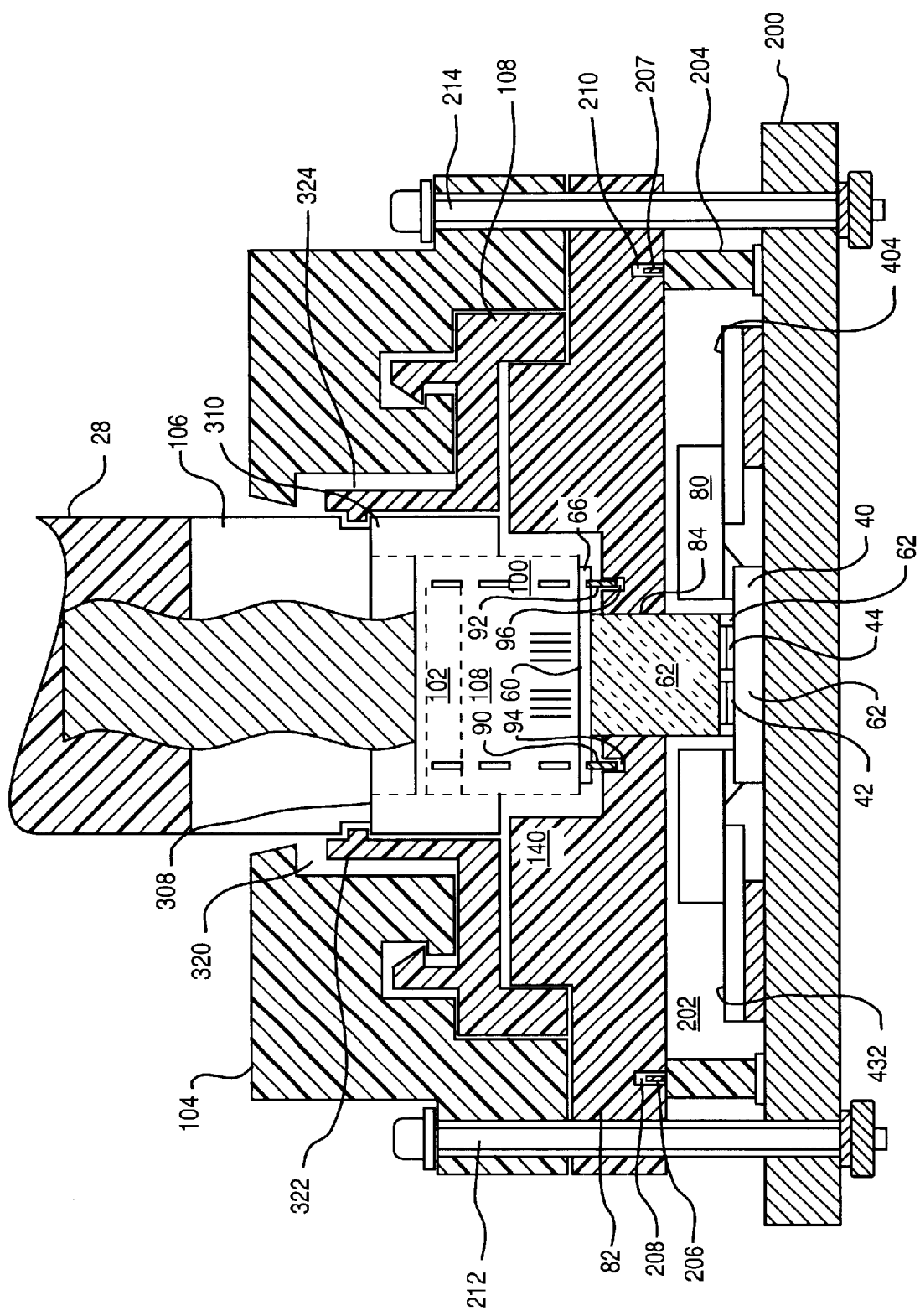
FIG. 4 is a cutaway view schematically showing the primary components of the fiber optic cable and transceiver connection system of the subject invention.

Faceplate 64, FIG. 4 provides clearance for fan out circuitry 80, FIG. 4 discussed infra, and faceplate 64 also collimates light emitted by array 42 and impinging on array 44. Faceplate 64 further over-samples all such light, and acts as a dust cover for VCSEL array 42 and detector array 44.

Support structure 62 is typically in the form of a ridge of epoxy upstanding from ASIC 40 supporting faceplate 64 and protecting arrays 42 and 44. Support structure 62 also provides the air gap required as a refractive index for VCSEL array 42.

Alignment coupler 82 (see also FIG. 5) includes opening 84 therein which accommodates faceplate 64. Connection system 5, FIG. 4 also includes means for fixing fiber bundle alignment plate 66 in a precise orientation with respect to alignment coupler 82 to establish a precise registration between the individual emitters and detectors of arrays 42 and 44 and the individual optical fibers in the orifices of alignment plate 66.

In the preferred embodiment, such means include pins 90, 92 extending from alignment plate 66 and corresponding orifices 94, 96 in alignment coupler 82 which receive pins 90 and 92, respectively.

Figure 5:
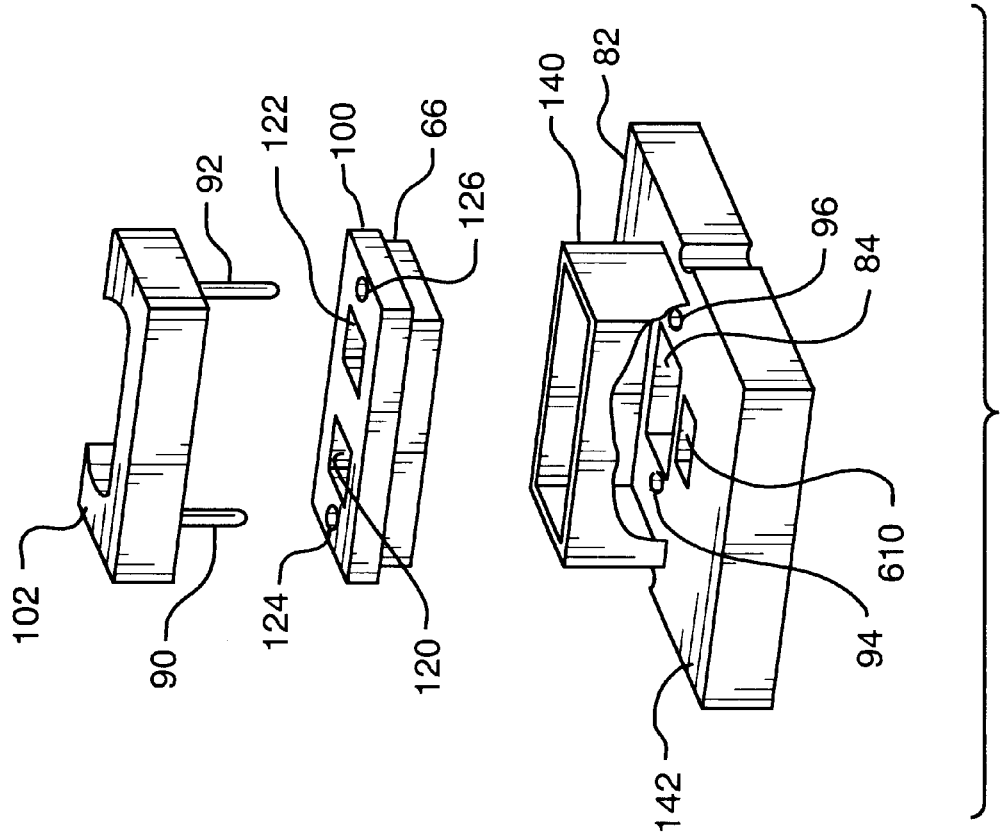
FIG. 5 is an exploded view of the pin holder, fiber ferrule, and alignment coupler components of the connection system of the subject invention.

As shown in FIG. 5, alignment plate 66 is mounted on or partially within fiber ferrule 100 which includes channels 120 and 122 therethrough corresponding to arrays 70, 72 of alignment plate 66 (see FIG. 3). Ferrule 100 also has orifices 124 and 126 therethrough for receiving pins 90 and 92 extending from pin holder 102.

When pin holder 102 is mated with ferrule 100, pins 90 and 92 extend through orifices 124 and 126 of plate 66 and also through holes 130, 132, FIG. 3, of alignment plate 66 and thus extend outwardly from alignment plate 66 which is received in housing 140, FIG. 5 extending upward from base plate 142 of alignment coupler 82.

Base plate 142 of coupler 82 includes orifices 94 and 96 within housing 140 which receive the distal end of pins 90, 92, respectively.

Referring again to FIG. 4, ASIC 40 is typically mounted on substrate 200 which may be an anchor plate and/or a heat sink. Standoffs 202 and 204 are placed on substrate 200 and alignment coupler 82 is mounted on standoffs 202 and 204. Typically, there are three or more such standoffs defining a flat plane for positioning coupler 82 with respect to arrays 42 and 44.

Pins 206, 207 extending from standoffs 202 and 204 are received in channels 208 and 210 in the bottom of alignment coupler 82. Fasteners 212 and 214 secure alignment coupler 82 with respect to substrate 200.

Figure 6:
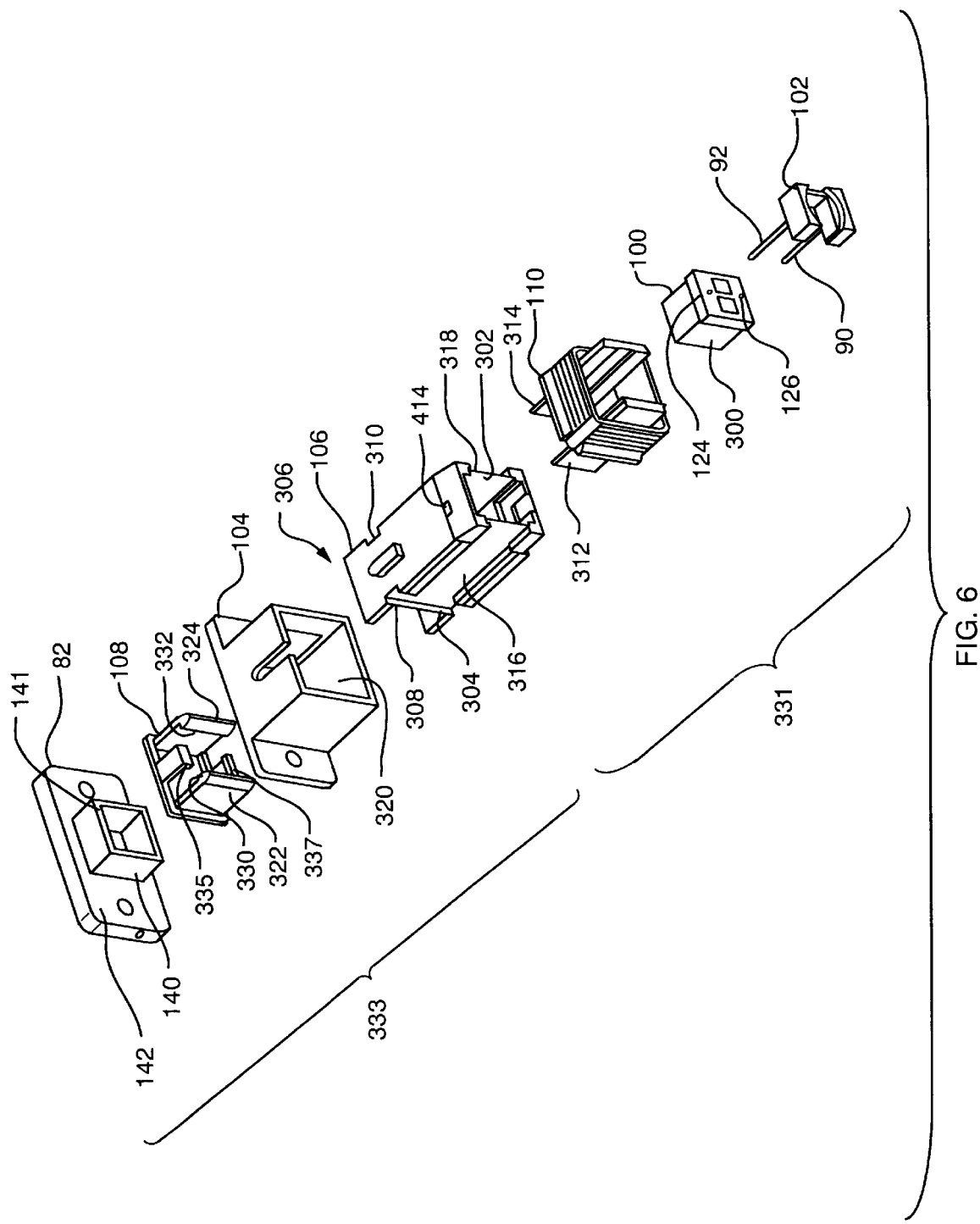
FIG. 6 is an exploded view of the primary components of the male and female connector components in accordance with the subject invention.

The remaining components of system 5 includes means for fixing ferrule 100, FIGS. 5–6 in housing 140 of alignment coupler 82. Typically, such means include plug body 106, FIGS. 4 and 6 which houses ferrule 100. Ferrule 100 includes flange 300 and plug body 106 includes channel 302 with an interior ledge (not shown) proximate end 304 which stops ferrule 100 and pin holder 102 mounted to ferrule 100 from passing completely out of end 306 of plug body 106. Plug body 106 also includes ridges 308 and 310 which retain plug body 106 in coupler body 104 fitted with latch 108.

Sliding latch 110 of plug body 106 is fitted on plug body 106 and includes ears 312 and 314 which slide to and away from ridges 308 and 310 in slots 316 and 318 of plug body 106.

Male connector portion 331, which is the combination of plug body 106, latch 110, ferrule 100 (with the attached alignment plate 66, FIG. 5) and pin holder 102, is received in female connector portion 333 which includes alignment coupler 82 and coupler body 104 fitted with latch 108. The distal end 306 of plug body 106 is received in channel 320 of coupler body 104 which includes latch members 322 and 324 of latch 108 also in channel 320.

When so assembled, latch members 322 and 324 are biased such that the distal hook ends 330 and 332 of the latch members are biased securely over ridges 308 and 310 of plug body 106.

However, by driving ears 312 and 314 of sliding latch 110 towards ledges 308 and 310 of plug body 106, hook ends 330 and 332 are dislodged from ledges 308 and 310 of plug body 106 and then the combination of plug body 106, latch 110, ferrule 100, and pin holder 102 can be removed from coupler body 104 and thus also from alignment coupler 82. In this way, male connector portion 331 is removed from female connector portion 333.

Note that coupler body 104, FIG. 5 is secured on alignment coupler 82 and thus fixed in place with respect to substrate 200 by virtue of fasteners 212 and 214. Housing 140 of alignment coupler 82 is correctly oriented in coupler body 104 by virtue of hook members 335 and 337 of latch 108, the distal ends of which rest on the top surface 141 of housing 140 of alignment coupler 82.

Figure 7:
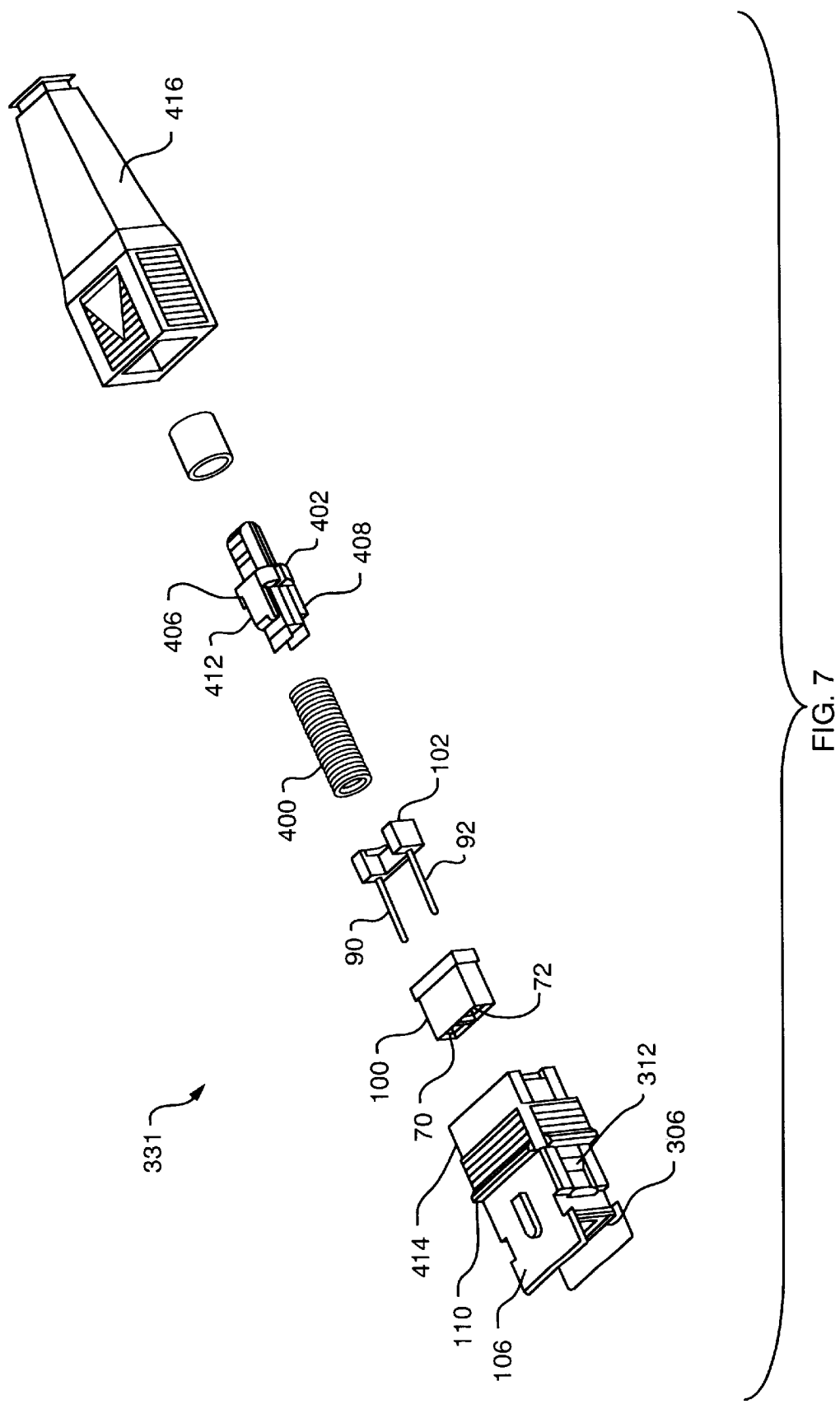
FIG. 7 is an exploded view schematically depicting the remaining components of the male portion of the coupler of the subject invention.

Fiber ferrule 100 and pin holder 102, FIG. 7 are biased into a location at distal end 306 of plug body 106 by spring 400 received in channel 302, FIG. 6 of plug body 106 and compressed by end fiber optic guide 402, FIG. 7 which is also received in channel 302. Guide 402 includes inwardly deflectable tabs 406 and 408 and each tab includes tang 412 received in side opening 414 of plug body 106. Cover 416 functions to cover and protect end guide 402.

Alignment of fiber bundle plate 66, FIG. 4, and the individual fibers in the orifices thereof with arrays 42 and 44 is accomplished as follows.

First, faceplate 62 is placed on epoxy ridges 62 of ASIC 40. Next, alignment coupler 82 is brought down over face plate 62 to rest on standoffs 202, 204, latch 108 is fitted in coupler body 104, and coupler body 104 is brought down on alignment coupler 82.

Fiber ferrule 100 is then mated with pin holder 102 and, before any individual fibers are threaded into fiber ferrule 100 and the orifices of alignment plate 66, the combination of fiber ferrule 100, fiber alignment plate 66, and pin holder 102 is placed in coupler body channel 320 until pins 90 and 92 are received in orifices 94 and 96, FIG. 5, of alignment coupler 82.

Fasteners 212 and 214, FIG. 4 are not fully tightened at this time. Alignment coupler 82 rests on standoffs 202 and 204 extending upward from substrate 200. Fiber alignment plate 66 now rests on face plate 64 and passive alignment can be accomplished by using a microscope to view the individual orifices of face plate 66 and to align those orifices correctly with face plate 62 and arrays 42 and 44 by moving alignment coupler 82 on standoffs 202 and 204.

Once this alignment step is completed, epoxy is then injected into the gap between the tops of each standoff 202, 204 and the bottom of alignment coupler 82 and allowed to cure. Fasteners 212 and 214 are then tightened. The combination of pin holder 102, and ferrule 100 is then removed from channel 320 of coupler body 104 and housing 140 of alignment coupler 82 and the individual fibers of the fiber bundle are threaded through the holes in the fiber alignment plate. Once this task is accomplished, pin holder 102 and fiber ferrule 100 are placed in connector plug body 106, and latch assembly 110 is positioned on plug body 310.

Once the fiber optic cable is connected to a second electronic device or a test assembly, active alignment can be accomplished, if required, by monitoring the corresponding signals and injecting epoxy into the remaining gaps of the structure shown in FIG. 4, especially around face plate 62.

Figure 8:
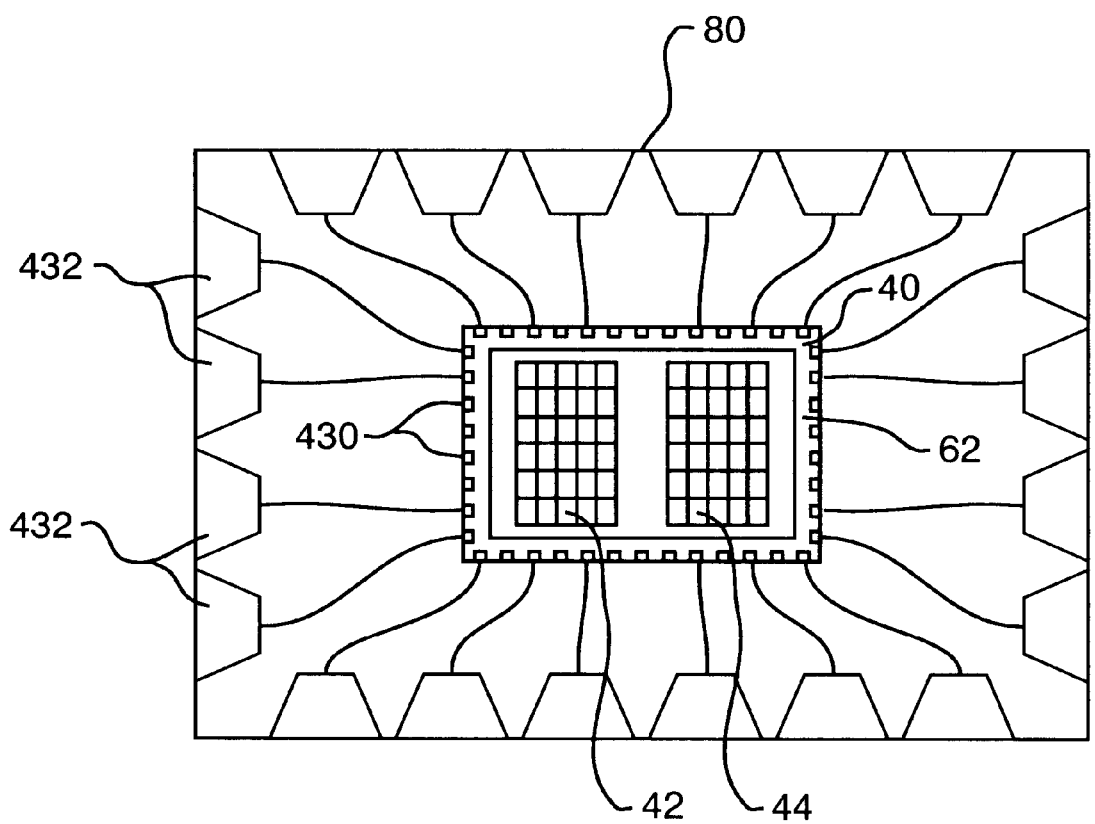
FIG. 8 is a top view of a fan out circuit surrounding a transceiver in accordance with the subject invention.

Fan-out board or circuit 80, FIGS. 4 and 8 provides the electrical connections between the bonding pads 430 on the edges of ASIC 40 and the larger interconnects 434 at the periphery of fan-out board 80 which has an opening therein sized to receive ASIC 40 as shown. In this way, flex circuit 404, FIG. 4 can be employed to electrically connect interconnects 432 of board 80 with the corresponding electrical interface of electronic device 12, FIG. 1.

As stated above, the combination of support structure 62, FIGS. 3 and 4, and face plate 64 provides the clearance required to accommodate fan-out board 80 and any other associated structure including flex circuit 404.

In one embodiment, support structure 62, FIG. 3 is in the form of a ridge of epoxy surrounding and between arrays 42 and 44 as shown.

Figure 9:
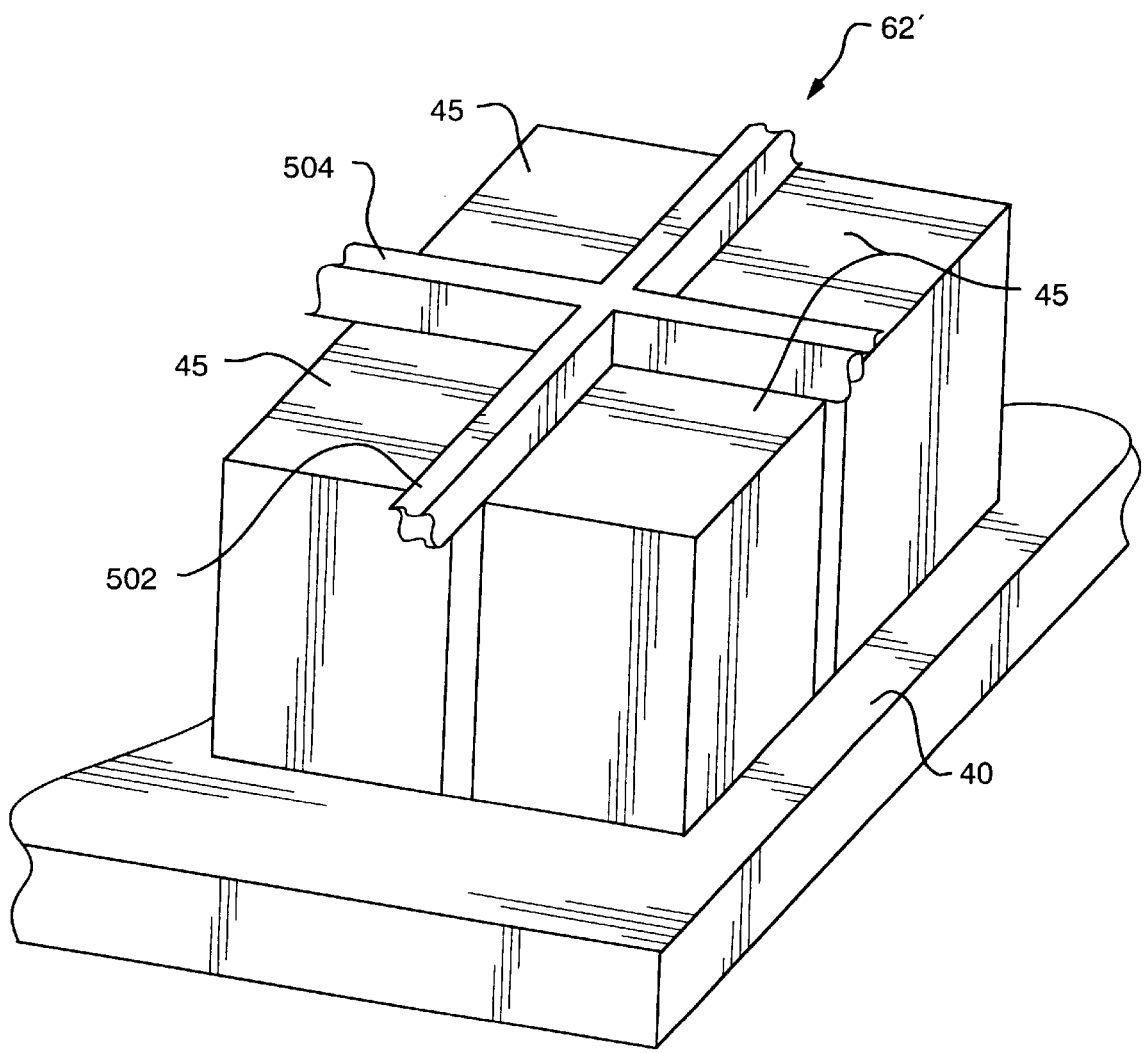
FIG. 9 is a schematic view of one particular support structure formed in the gaps between individual light emitting elements in accordance with the subject invention.

In another embodiment, however, support structure 62' is in the form of epoxy members 502 and 504, FIG. 9 in the gaps between individual VCSELs 45 as shown.

Figure 10:
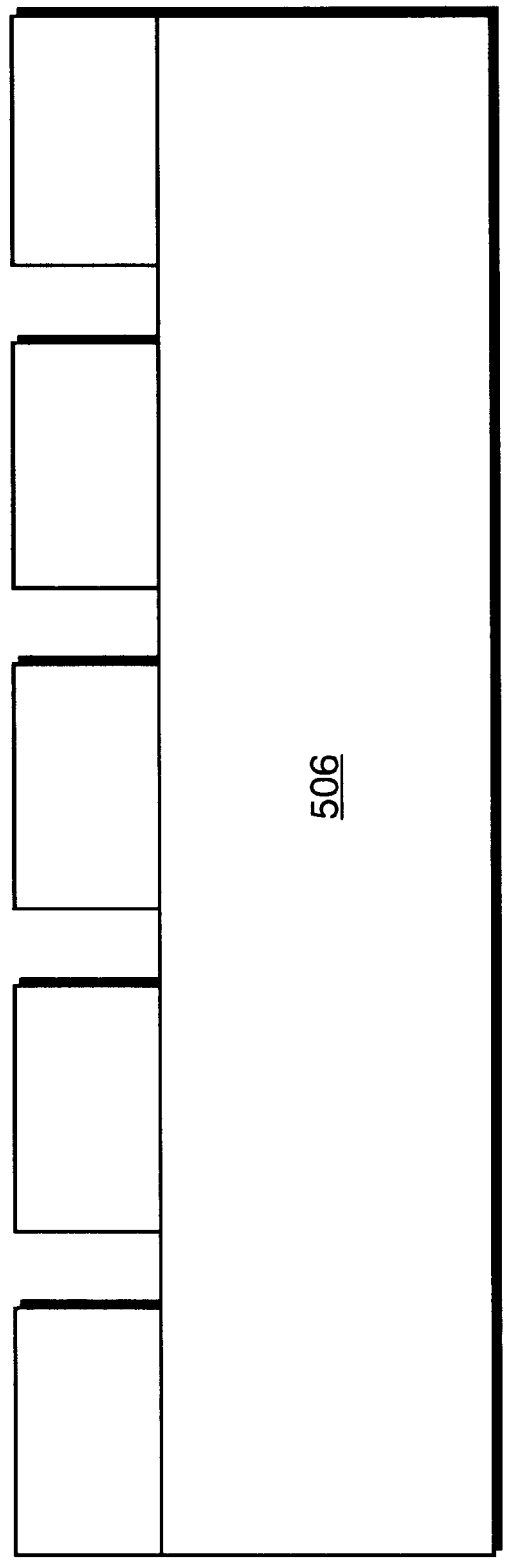
FIGS. 10–12 are schematic views showing the primary steps associated with forming the support structure of FIG. 9.

To form this structure, VCSEL GaAs wafer 506 is shown in FIG. 10 at the step in processing where individual VCSELs are to be electrically isolated from each other and therefore masked prior to etching. Etching is accomplished as is common but deeper than otherwise required to achieve electrical isolation and therefore to form deep cavities 510, FIG. 11 which will subsequently be filled partially or wholly with epoxy.

Figure 11:
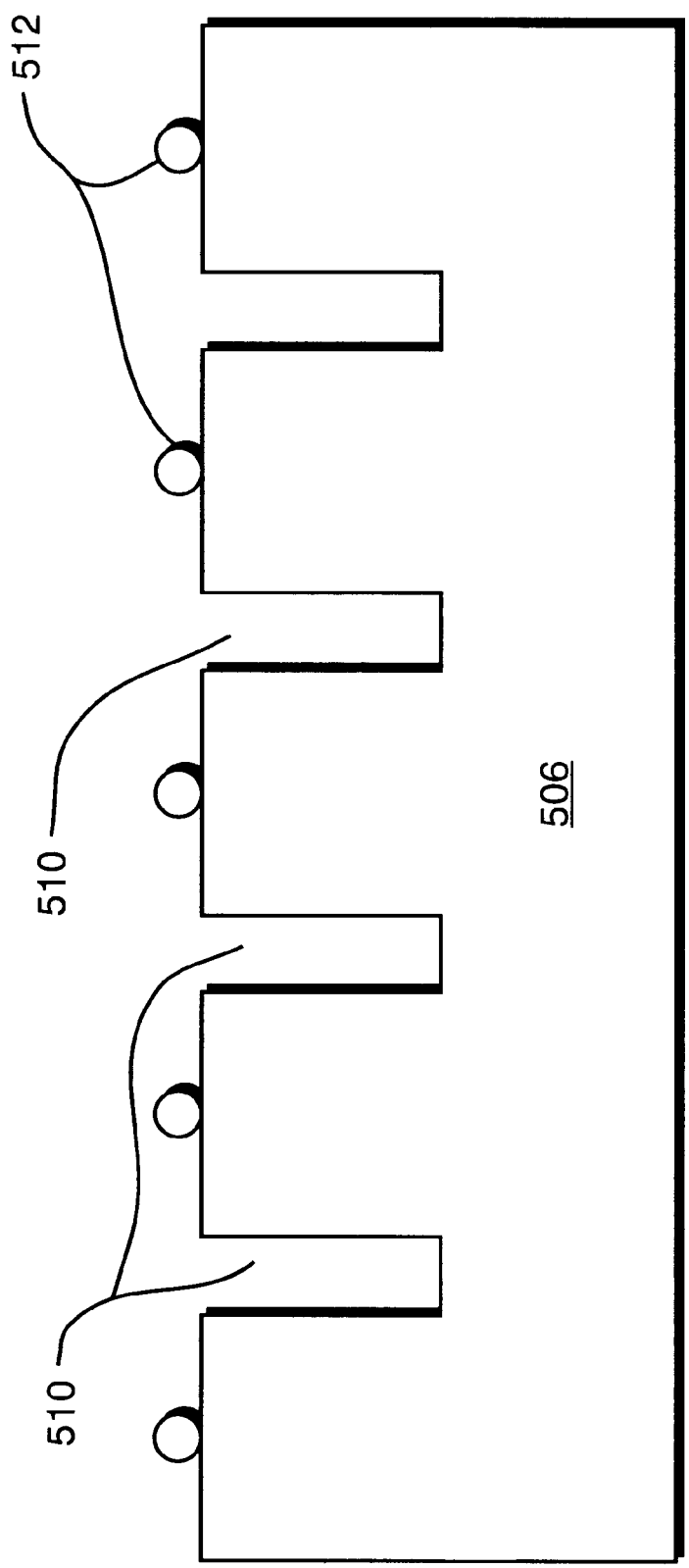

As shown in FIG. 11, the masking material is removed and solder bumps 512 applied to each VCSEL. This structure is then flip-chipped bonded to ASIC 40 after filling channels 510 with a flowable hardener 514, FIG. 12, for example, an epoxy.

Finally, lapping or grinding and selective etching operations such as reactive ion etching are performed to remove all structure from wafer 506 except the individual VCSELs and the epoxy resulting in the structure shown in FIG. 9.

Figure 13:
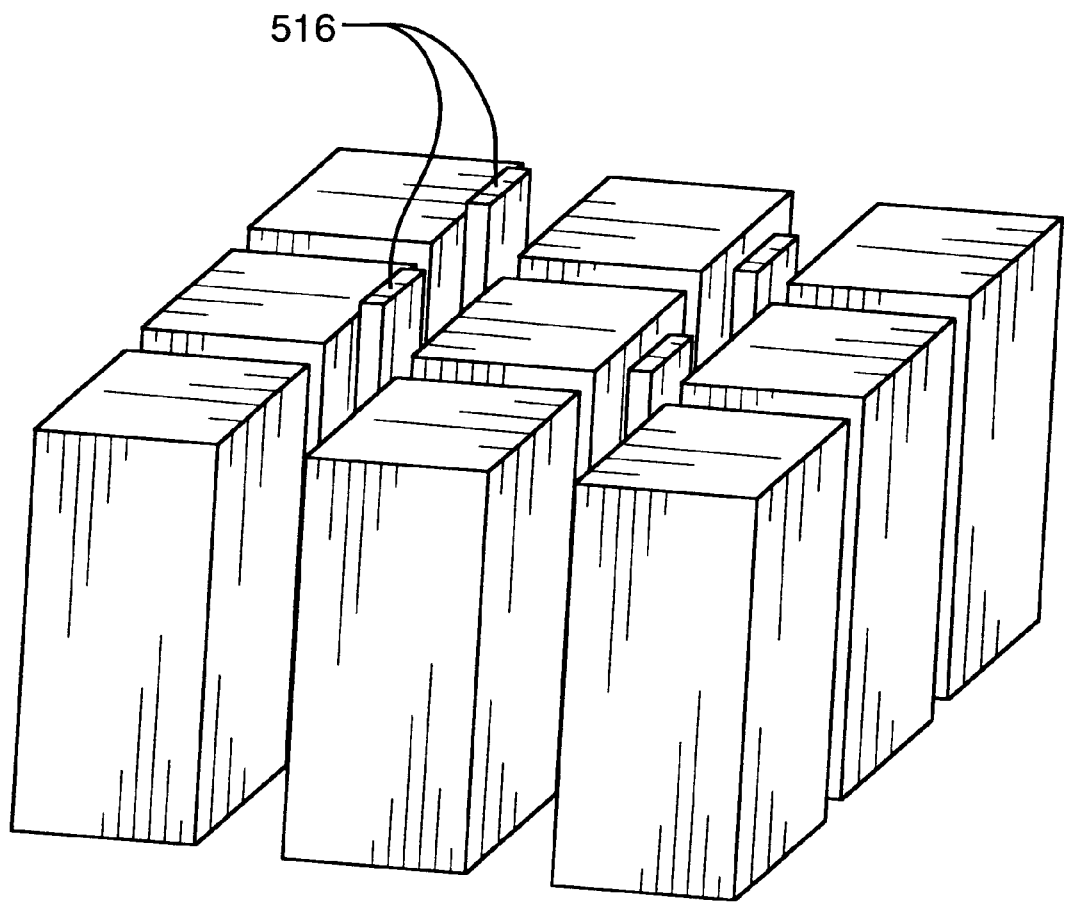
FIG. 13 is a schematic view of an alternative support structure in the gaps between individual light emitting devices in accordance with the subject invention.

In another embodiment, epoxy posts 516, FIG. 13 are formed at selected locations in the gaps or channels between individual VCSELs.

Although the embodiments discussed above refers to the VCSEL array, the support structures disclosed could be included with other arrays of active elements including other laser emitting devices and/or detector arrays such as photodiodes as shown in FIG. 4.

The support structure in any form assists in controlling the geometry of the interface between the optical devices and facilitates setting optical face plate 62 parallel to the surface of ASIC 40 with the arrays of emitters and detectors thereon. The support structure also insures that there is a gap required for proper functioning of the VCSELs.

In FIG. 3, after the emitter and detector devices are hybridized to the integrated circuit, a quantity of epoxy or similar material is dispensed around the perimeter of the emitters and detectors and allowed to cure. Next, the epoxy, along with the devices, during the substrate removal step, is lapped to a predetermined thickness, typically about 35 $\mu$m. When the remainder of the substrate is removed by etching (chemical-mechanical polish or dry etching) the smooth electrical layer is revealed at a distance below the surface of the epoxy. The difference is determined by the amount of material lapped away and the actual thickness of the grown layers.

According to the embodiment of FIG. 9, after the completion of the front side of the device and singulation has occurred, the device can be hybridized to the integrated circuit in the traditional manner. The critical control of the standoff height is provided during the lapping step and can be controlled to better than 20 micron variation in the Z direction.

During the creation of the separate devices on a wafer, e.g., a VCSEL or pin diode, front side etching is accomplished in order to cause electrical isolation of adjacent devices. This is done by photolithographic patterning and followed by etching (wet or dry techniques). By etching trenches to a depth that is through the devices' electrically conductive layer and an additional distance dictated by the requirements of the optical standoff, a mold is created which will be revealed during subsequent processing, FIG. 11.

Figure 12:
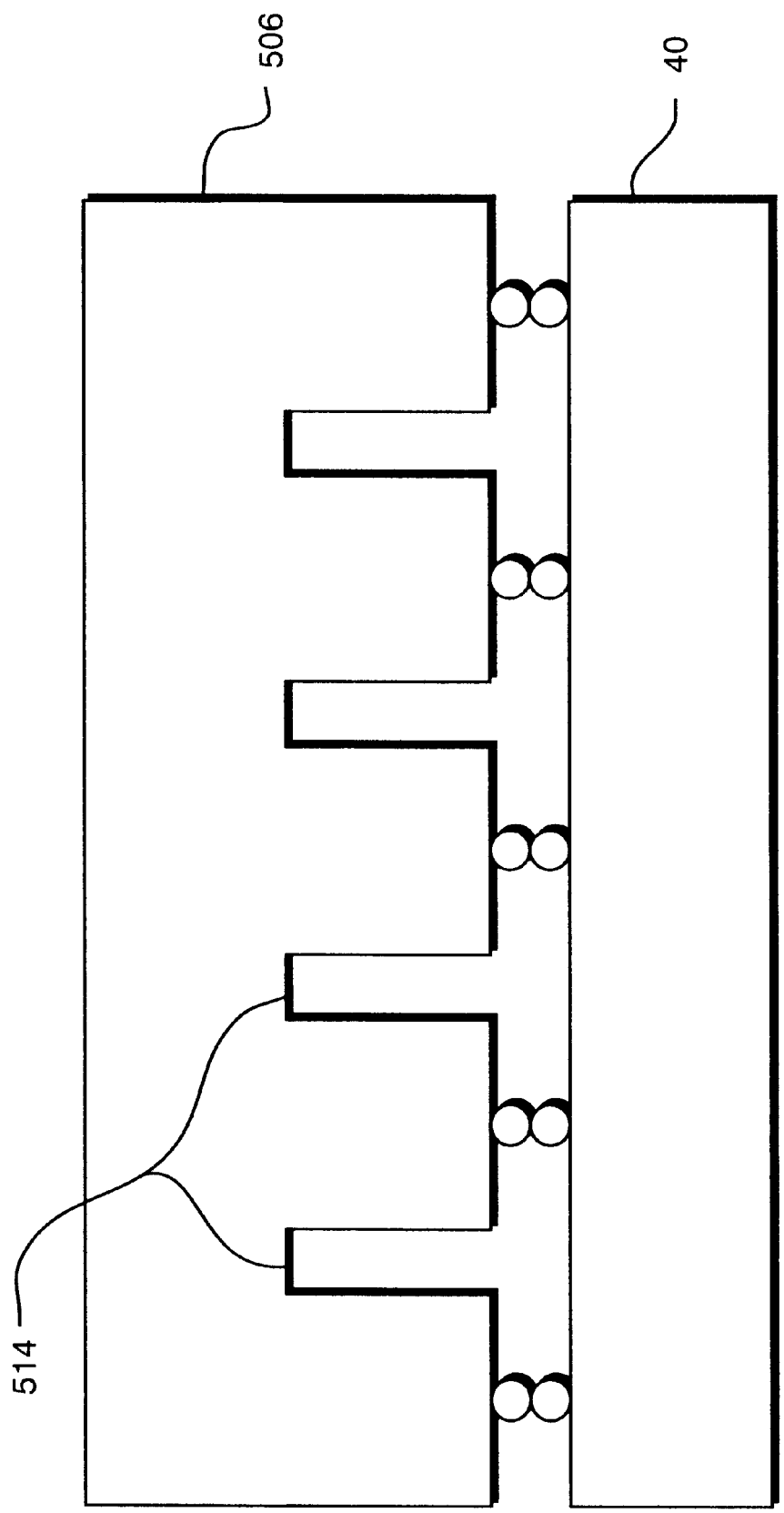

After the completion of the front side of the device and singulation has occurred, the device can be hybridized to the integrated circuit in the traditional manner, FIG. 12. The main difference is the processing which takes place with regard to the application and retention of the epoxy. Instead of a need to build up a quantity of epoxy on the perimeter of the hybridized chips, the epoxy only needs to be applied sparingly so that it acts to underfill between the surfaces of the hybridized chip and the integrated circuit. In fact, either before or after curing of the epoxy, all of the residual material can be removed from the surfaces and it may prove advantageous to remove this layer to prevent it from affecting an errant standoff. In this case, the lapping and etching steps are performed in the normal manner but because of the deeper than normal etching performed during the front side fabrication steps, a grid of epoxy emerges as shown in FIG. 9 with the islands of the active devices within the grid.

Because the dimensions are determined by the very accurate etch depth determined by the front side processing and not by the lapping step as with the previous method, the height of the epoxy at the end of the process can be much better controlled. The distance of the faceplate to the surface of the active devices can be controlled within a few microns in accordance with this method as opposed to about 20 microns of the previous method.

Figure 14:
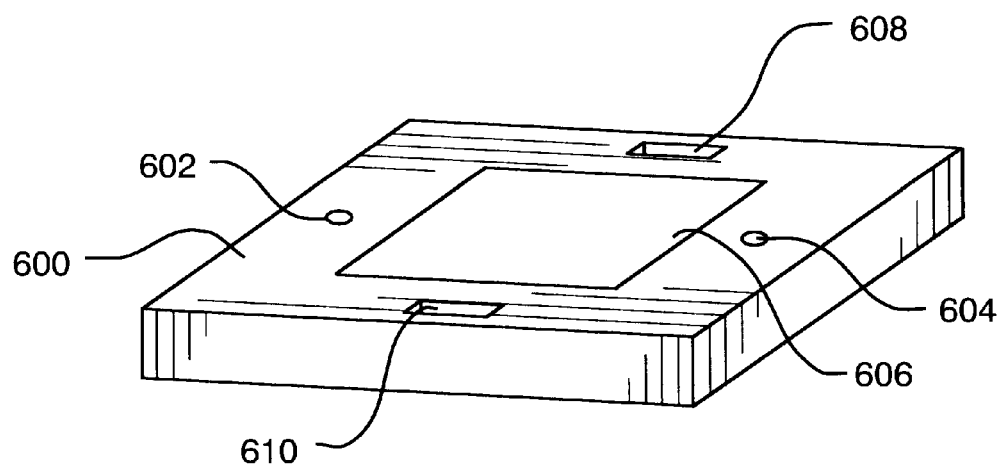
FIG. 14 is a schematic view of a precision insert plate for the molded alignment coupler components of the subject invention.

Another aspect of this invention concerns insert 600, FIG. 14. All of the components shown in FIG. 6 with the exception of pins 90 and 92 are typically injection molded plastic parts. Using injection molding processes, it is typically difficult to obtain very close tolerances, for example, regarding the size and spacing of pin orifices 94 and 96, FIG. 5 of alignment coupler 82.

Figure 15:
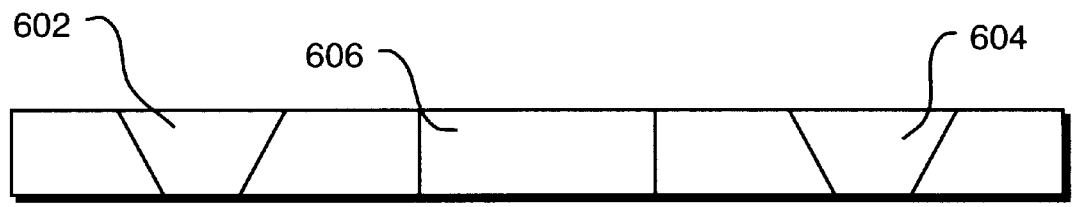
FIG. 15 is a cross-sectional view of precision alignment plate shown in FIG. 14.

Accordingly, in this invention, insert plate 600, FIGS. 14–15 is fabricated using wet or dry etching processes when plate 600 is made of silicon or titanium.

Insert plate 600 is placed in housing 140, FIG. 5 of alignment coupler on base plate 142 and thus insert plate 600, FIG. 14 includes orifices 602 and 604 which communicate with orifices 94 and 96, FIG. 8 of alignment coupler 82. Insert plate 600 also includes opening 606 corresponding to opening 84 of coupler 82.

To more accurately position insert plate 600 in housing 140 of coupler 82, plate 600 is fashioned with key orifice 608 and 610 and base plate 142 of alignment coupler 82, FIG. 5 includes key 610 and another similar opposing key (not shown). Similar insert plates may be fabricated for the interface between each component shown in FIG. 6: one for each end of pin holder 102, one for each end of ferrule 100, and one for each end of coupler body 104. Typically, the insert plates are held in place with an adhesive.

Thus, instead of relying on injection molded parts to provide the high precision required to couple a fiber optic bundle to an optoelectronic device such as a transceiver, insert plate 600 employs a high precision photolithograpically defined surface capable of very tight tolerances.

Prior art "push-pull" connectors such as the "MT" type connectors are commonly used to interconnect only a very small number of fibers in a bundle and thus are not suitable for the subject invention. Because of the large number of fiber bundles that are now planned for single terminal interconnection, a more robust solution is required. Moreover, the connector must be robust due to the hostile environment that the connectors are exposed to during insulation and operation, e.g., pulling the cables through crawl spaces and over sharp edges.

As stated above, the connector components of FIGS. 4–7 are typically made of injection molded plastic components. Insert plate 600, FIG. 14 is used in conjunction with these components. As shown in FIG. 15, pin orifices 602 and 604 are conical in shape with the larger end facing the fiber bundle. Fortunately, this is a typical artifact of wet etching processing and can also be produced with dry etching.

Insert plate 600 is placed into the body of alignment coupler 82, FIG. 6 and attached by staking and/or by an adhesive. The ends of pins 90 and 92 are then typically chamfered to facilitate entry into conical guide holes 602 and 604, FIG. 15. By using the high precision insert shown in FIG. 14 together with the other injection molded connector pieces shown in FIG. 6, a durable and precise interconnection is obtained. For example, fiber ferrule 100, FIG. 6 could include a precision insert plate on both ends thereof and pin holder 102 could include a precision insert plate placed over pins 90 and 92 to retain the critical guide pins and allow the male half of the connector to be fabricated to similar high tolerances as described above for the female portion.

Figure 16:
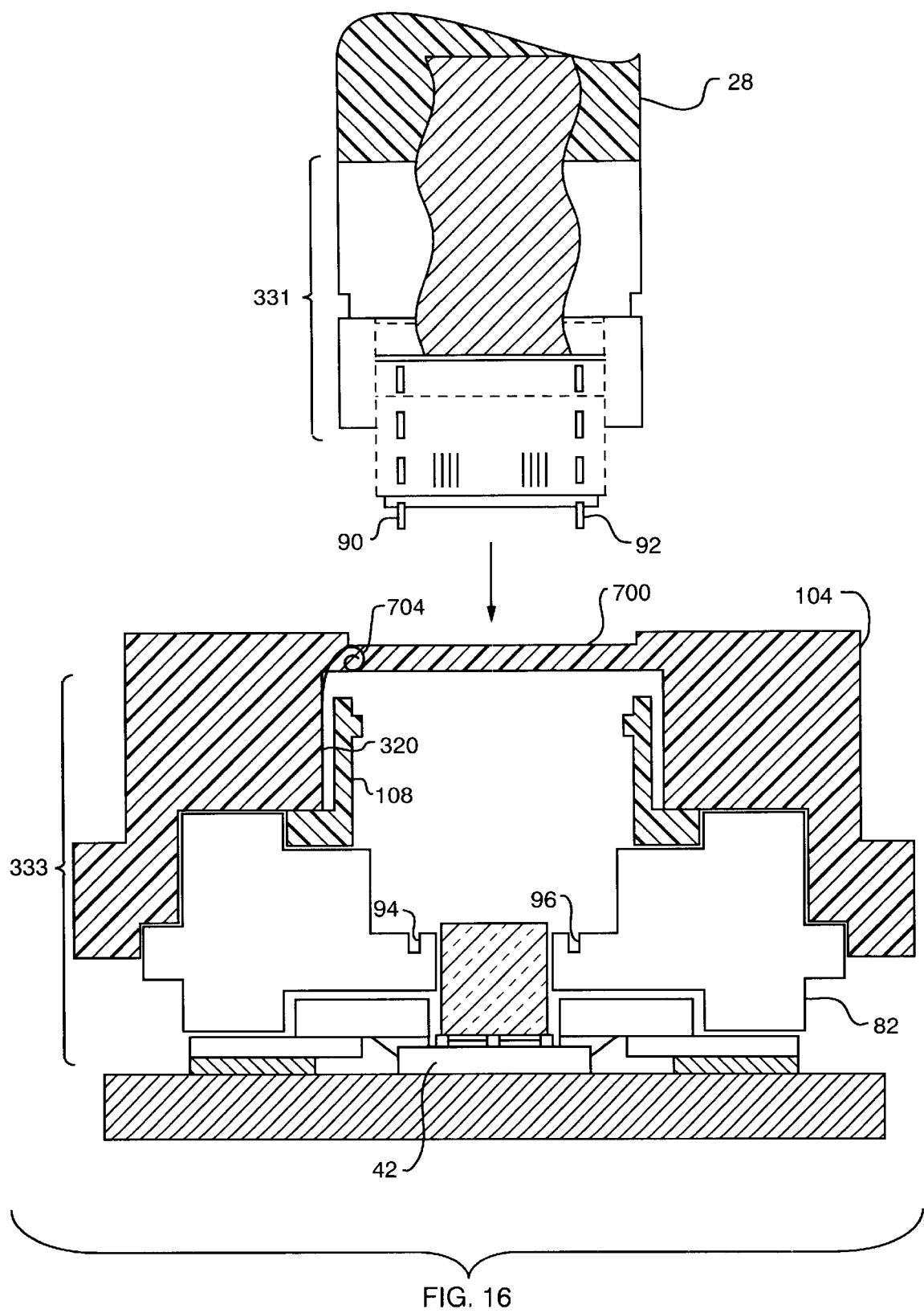
FIG. 16 is a view of the protective door sealing the top of the female coupler portion of the subject invention to prevent laser light from escaping the female coupler portion.

Another aspect of this invention includes a device which protects personnel from exposure to harmful laser light. Laser light emitted by VCSEL array in conduit 42, FIG. 16 is harmful to human eyes and thus, in the embodiment shown in FIGS. 16–17, coupler body 104 includes spring loaded trap door 700 spanning the top of channel 320.

Figure 17:
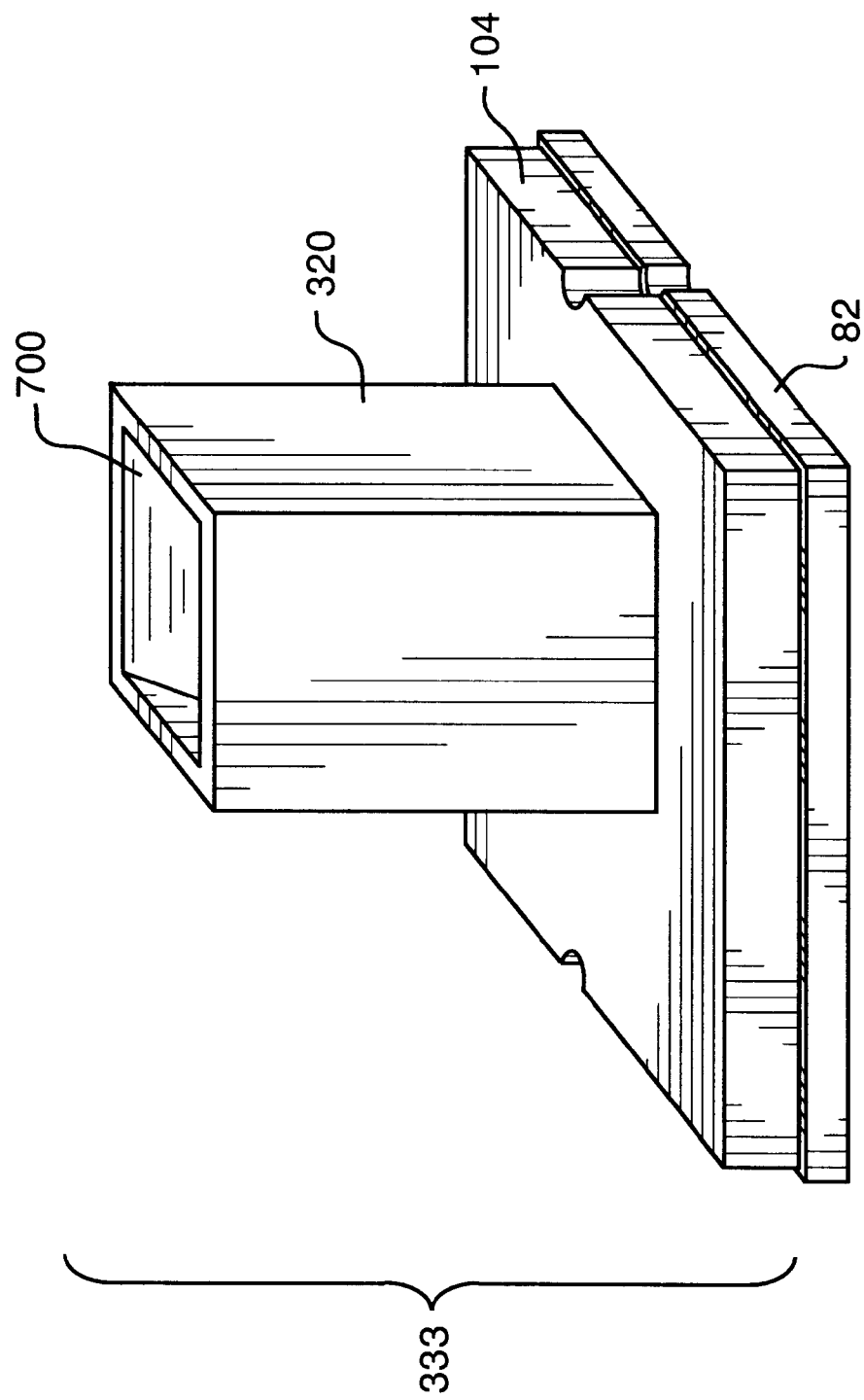
FIG. 17 is a schematic view showing the female portion of the coupler of the subject invention with the trap door swung downward to receive the male portion of the fiber optic coupler in accordance with the subject invention.

In this way, when male connector 331 is pushed into channel 320, trap door 700 swings downward as shown in FIG. 17. Pins 90 and 92 are then received in orifices 94 and 96, FIG. 16 as discussed above. When male connector 331 is removed from channel 320, door 700, biased upward by spring 704, FIG. 16, automatically moves upward covering the top of channel 320 preventing laser light from exiting channel 320.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A fiber optic cable and transceiver connection system comprising:

at least one two dimensional array of emitters and detectors fixedly oriented on a substrate;

a support structure about said array;

a collimator supported by the support structure;

a female connector comprising: an alignment coupler disposed about said collimator, and a coupler body about said alignment coupler, wherein said coupler body has a door spanning an opening, said door being spring biased to cover said opening;

at least one fiber bundle comprising a plurality of optical fibers; and a male connector, configured to be received by said female connector, said male connector comprising a ferrule and an alignment plate, wherein said ferrule is disposed about said plurality of optical fibers and said alignment plate aligns said optical fibers with said two dimensional array of emitters and/or detectors.

2. The fiber optic cable and transceiver connection system according to claim 1, wherein said door is comprised of a material capable of shielding light emitted from said array.

3. The fiber optic cable and transceiver connection system according to claim 1, wherein said array is comprised of VCSEL emitters and photodetectors mounted on an ASIC substrate.

4. The fiber optic cable and transceiver connection system according to claim 1, further including a pair of pins extending from said alignment plate and corresponding orifices in said ferrule assembly for receiving the pins.

5. The fiber optic cable and transceiver connection system according to claim 1, wherein said support structure is a plurality of standoffs.

6. The fiber optic cable and transceiver connection system according to claim 1, further comprising fasteners on said coupler body for releasably attaching said connector.

7. The fiber optic cable and transceiver connection system according to claim 1, wherein said collimator is a faceplate.

8. The fiber optic cable and transceiver connection system according to claim 1, further wherein said fiber ferrule houses said alignment plate.

9. The fiber optic cable and transceiver connection system according to claim 8, further comprising a pin holder coupled to the fiber ferrule.

10. The fiber optic cable and transceiver connection system according to claim 8, further comprising a connector plug body housing the fiber ferrule.

11. The fiber optic cable and transceiver connection system according to claim 1, further comprising array circuitry in said substrate.

12. The fiber optic cable and transceiver connection system according to claim 1, wherein said support structure provides a gap above said array.

13. The fiber optic cable and transceiver connection system according to claim 1, wherein said substrate comprises a substrate chosen from the group of substrates consisting of anchor plates and heat sinks.

14. The fiber optic cable and transceiver connection system according to claim 1, wherein said ferrule assembly comprises:

a plug body having a channel, interior ledge and a sliding latch;

a ferrule comprising at least one channel, at least one said alignment plate having a plurality of apertures, at least one flange; and a pin holder mated to said ferrule and holding at least one pin extending through said alignment plate, wherein said plug body houses said ferrule, which is held wit said pin holder within said plug body by said interior ledge.

\* \* \* \* \*